(12) United States Patent
Loiseau et al.

(10) Patent No.: US 8,945,348 B2
(45) Date of Patent: Feb. 3, 2015

(54) CARBONIZATION METHOD AND DEVICE

(75) Inventors: Arnaud Loiseau, Mussy sur Seine (FR);
Philippe Soler-My, Gif-sur-Yvette (FR);
Pierre Soler-My, Buxueil (FR)

(73) Assignee: Carbonex Societe A Responsabilite Limitee, Gye-sur-Seine (FR)

( * ) Notice: Subject to any disclaimer, the term of this patent is extended or adjusted under 35 U.S.C. 154(b) by 1048 days.

(21) Appl. No.: 12/992,799

(22) PCT Filed: May 12, 2009

(86) PCT No.: PCT/FR2009/050867
§ 371 (c)(1),
(2), (4) Date: Feb. 18, 2011

(87) PCT Pub. No.: WO2009/147346
PCT Pub. Date: Dec. 10, 2009

(65) Prior Publication Data
US 2011/0132742 A1    Jun. 9, 2011

(30) Foreign Application Priority Data

May 13, 2008    (FR) ...................................... 08 53093

(51) Int. Cl.
*C10B 49/02*    (2006.01)
*C01B 31/08*    (2006.01)
*C10B 53/02*    (2006.01)

(52) U.S. Cl.
CPC ............... *C10B 49/02* (2013.01); *C01B 31/081* (2013.01); *C10B 53/02* (2013.01); *Y02E 50/10* (2013.01); *Y02E 50/14* (2013.01); *Y02E 50/30* (2013.01)
USPC .................... 201/29; 201/35; 201/37; 201/40; 202/99; 202/266

(58) Field of Classification Search
USPC .......... 201/27, 29, 35, 37, 40, 43; 202/97, 99, 202/108, 208, 266
See application file for complete search history.

(56) References Cited

U.S. PATENT DOCUMENTS

| | | | |
|---|---|---|---|
| 863,718 A * | 8/1907 | Jewett | 202/266 |
| 1,680,613 A * | 8/1928 | Hennebutte et al. | 202/266 |
| 2,160,341 A * | 5/1939 | Reichert | 201/43 |
| 2,705,697 A | 4/1955 | Royster | |
| 3,971,704 A | 7/1976 | von Klenck et al. | |

(Continued)

FOREIGN PATENT DOCUMENTS

| | | |
|---|---|---|
| DE | 2844741 A1 | 4/1980 |
| FR | 2586031 A1 | 2/1987 |

(Continued)

*Primary Examiner* — Jill Warden
*Assistant Examiner* — Joye L. Woodard
(74) *Attorney, Agent, or Firm* — Laurence A. Greenberg; Werner H. Stemer; Ralph E. Locher (57) ABSTRACT

The invention relates to a method of manufacturing charcoal. It is characterized in that: first hot gases are generated by at least one heating means; its first gases are mixed with second gases in order to form a gas mixture; this mixture is sent into a charge of wood in order to generate therein a pyrolysis front; an overpressure is created between the upstream end and the downstream end of the charge so as to force this front to pass through it in one direction, namely from the upstream end to the downstream end; and third gases are recovered downstream of the charge, at least a first portion of said third gases, in the form of a stream of said second gases, is conveyed by a conveying means. The invention also relates to a device for implementing this method.

5 Claims, 2 Drawing Sheets

(56) References Cited

U.S. PATENT DOCUMENTS 4,300,915 A 11/1981 Schmidt et al.
6,790,383 B2 9/2004 Kim

FOREIGN PATENT DOCUMENTS

GB 1440236 A 6/1976
WO 0248292 A1 6/2002

* cited by examiner

CARBONIZATION METHOD AND DEVICE

BACKGROUND OF THE INVENTION

Field of the Invention

The invention relates to a process for manufacturing charcoal, or/and activated carbon, from a wood load.

The invention also relates to a kiln module for manufacturing charcoal or/and activated carbon, by implementing this process, designed to be capable of receiving, in a carbonization chamber, a basket designed to be capable of receiving a wood load, said carbonization chamber being positioned between an upstream chamber and a downstream chamber, said kiln module comprising or being connected to at least one heating means external to said load and designed to be capable of generating first non-oxidizing hot fuel gases.

The invention also relates to a carbonization installation, in particular for the manufacture of charcoal or/and activated carbon, according to one such process, comprising several such kiln modules.

The present invention comes under the field of the manufacture of charcoal from lignocellulosic materials of any moisture content.

In order to carry out the carbonization of the wood, the temperature of a wood load is raised in a known manner. At a certain stage that corresponds to a certain temperature level in the load, a pyrolysis reaction is initiated. Once the pyrolysis reaction is completed, the product resulting from the reaction is charcoal. It is also possible to increase the temperature of the load, so as to obtain a more burnt charcoal. Next, the heating means is stopped and the charcoal load is cooled.

Carbonization devices can be classified according to their heating means:
  partial-combustion kilns are generally traditional kilns; a portion of the wood load is burnt in order to carbonize the rest of the load;
  externally-heated kilns use an additional source of energy;
  hot-gas contact kilns are compromises between the preceding models, and are used in particular as industrial continuous kilns.

The prior art is not perfect since many problems are not solved correctly. It is difficult and costly to use green or wet wood. Therefore, it is often necessary to dry, upstream of the charcoal manufacture, the wood or the offcuts of logging or saw mill operations, for 3 to 6 months. This drying is often carried out in a dryer or a separate kiln, which requires significant expenditure on energy.

The small dimensions of existing kilns make it necessary to precut the load into small pieces, in particular for industrial continuous kilns.

For traditional kilns, the carbonization device is immobilized in order to cool the charcoal, which lengthens the cycle times by 2 to 12 days depending on the size of the kiln.

The process is monitored by an operator, and consists of a subjective, olfactory and visual monitoring of the flue gases. In certain industrial installations, temperature sensors enable the process to be monitored.

Current kilns do not permit a homogeneous control of the carbonization temperatures during the process. In fact, there are parts of kilns which are much hotter than desired, and other parts which are colder. The resulting charcoal is not very homogeneous at all, which reduces the quantity of charcoal obtained and is detrimental to the desired quality.

Many processes make it necessary to handle the charcoal during the carbonization and/or cooling thereof, increasing the amount of fines, which are of small size and of low value.

Various devices have attempted to overcome these problems. Thus, known from document FR 2 604 181 is a kiln for manufacturing charcoal in a container-basket in which hot gases circulate, at a temperature below 400° C., through the load from top to bottom.

Document FR 2 586 031 describes a multi-chamber device, each chamber corresponding to one step of the charcoal manufacturing process: drying, carbonization, ventilation, and each chamber equipped with two boilers. The combustion air is introduced by a fan.

Document EP 330 784 describes kilns that function in pairs: one is used for the carbonization, and the hot gases produced during the reaction are conveyed to the other kiln which is used to dry the wet or green wood.

In fields other than that of the carbonization of wood, installations are known that reuse, at least partially, gases resulting from the reaction in the installation. Thus, document GB 1 440 236 is known, which describes a furnace for treating waste via incineration that functions in a continuous loop: distillation gases resulting from the reaction in the chamber of the furnace are, after a necessary purification which makes it possible to reinject tar and impurities to be retreated into the furnace, separated into two portions of gas which follow separate circuits. The first portion necessarily undergoes a scrubbing treatment, then is injected as fuel into a reheating furnace before release into the atmosphere. The second portion is reheated by heat exchange in this preheating furnace, without contact with the flow of gas of the first portion, then reinjected into the incineration furnace. This process absolutely requires purification or/and scrubbing treatments of the gases in order to enable them to be reused. The installation is complex, comprises separate gas circuits, and the control of the gas temperatures is difficult. No arrangement takes into account, for a carbonization treatment, the need to inject into the load a gas that is free of oxygen gas $O_2$. Such a furnace cannot be used for carrying out a carbonization process.

Document WO 02/48292 describes a continuous process for the gasification of carbon-based waste, taken, in a chamber, to a very high temperature (1300° C.) in the presence of steam and carbon dioxide. A portion of the pyrolysis gases resulting from the reaction is directly used as fuel. Except for the possibility of injecting, especially for the start-up, fuel, there is no possibility of controlling the recycle gas. Furthermore, the latter is only reused through its obligatory combustion.

Such installations, provided for the incineration of waste, are not very suitable for the carbonization of wood, which is a tricky process during which it is necessary to generate an incomplete combustion of a wood load, while avoiding any runaway of the kiln used for this purpose, and therefore to permanently control the temperature within this load.

In existing carbonization kilns, the residence time of the kilns remains long, which requires setting up a bank of several kilns in order to carry out the drying, carbonization and cooling operations of the load.

BRIEF SUMMARY OF THE INVENTION

The objective of the invention is to overcome the drawbacks of the prior art by proposing a particular method for carrying out the carbonization process, starting from green or wet wood, in a kiln module designed for this purpose, that makes it possible to reduce the residence time thereof, and to obtain a good rotation of the loads, with a good energy efficiency.

The invention also proposes to provide the conditions for regulating a good carbonization reaction within a wood load, by the control of the flows and of the temperatures of the various gases used. The invention uses the gases circulating in the device for implementation of the process, by carrying out appropriate mixing of the various gases present at various points of the installation, in order to introduce, upstream of the load, incoming gases with the best parameters for initiating or/and maintaining the carbonization reaction with an optimum efficiency, in particular via an optimum control of the distribution of the temperature in the wood load, and the production of a charcoal of excellent quality.

The invention ensures that the gases present at various points of the installation are used as is, without carrying out a purification, scrubbing or similar treatment, so as to render the device as simple as possible. The invention also avoids, as much as possible, the combustion of the recycled gases.

For this purpose, the invention relates to a process for manufacturing charcoal or/and activated carbon from a wood load, characterized in that:

via at least one heating means external to said load, first non-oxidizing hot fuel gases are generated that do not comprise oxygen in gaseous form $O_2$;

said first hot fuel gases are mixed with second dilution gases, in order to form a mixture of non-oxidizing incoming gases that do not comprise oxygen in gaseous form $O_2$;

said mixture of incoming gases is sent upstream into said load in order to generate therein a pyrolysis front;

an overpressure is created between the upstream end and the downstream end of said load in order to force said pyrolysis front to pass through it in a single direction from the upstream end to the downstream end;

downstream of said load third exiting gases are recovered, at least a first portion of which is transported in the form of a flow of said second dilution gases by a transportation means, and a second portion of which complementary to the first portion is discharged in the form of a flow of fourth service gases by a transportation means to an outlet orifice.

The invention also relates to a kiln module for manufacturing charcoal or/and activated carbon, by implementing this process, designed to be capable of receiving, at a carbonization chamber, a basket designed to be capable of receiving a wood load, said carbonization chamber being positioned between an upstream chamber and a downstream chamber, said kiln module comprising or being connected to at least one heating means external to said load and designed to be capable of generating first non-oxidizing hot fuel gases, characterized by the fact that it comprises, upstream of said upstream chamber, a mixing chamber designed to be capable of receiving, on the one hand said first fuel gases, and on the other hand second dilution gases originating from transportation means that communicate with said downstream chamber, in order to form a mixture of incoming gases.

The invention also relates to a carbonization installation, in particular for the manufacture of charcoal or/and activated carbon as claimed in one such process, comprising several such kiln modules, said installation comprising at least one central furnace that generates fuel gases for at least two kiln modules which are connected to it.

BRIEF DESCRIPTION OF THE SEVERAL VIEWS OF THE DRAWING

Other features and advantages of the invention will emerge from the detailed description which follows of non-limiting embodiments of the invention, with reference to the appended figures in which.

DESCRIPTION OF THE INVENTION

The invention relates more particularly to a process and a kiln module 100 for manufacturing charcoal, or/and activated carbon, from a wood load 6. A first embodiment of the invention is illustrated in the figures.

The invention uses an innovative process for manufacturing charcoal or/and activated carbon from a wood load 6 positioned in a carbonization chamber 25, the distinctive feature of which process is the initiation, by at least one heating means external to the load 6, or else external to a kiln module 100 into which this carbonization chamber 25 is integrated, of a pyrolysis front 20, followed by the controlled propagation of this pyrolysis front 20. For this purpose, the process comprises the following steps:

via at least one heating means external to said load 6, first hot gases known as non-oxidizing fuel gases G1, are generated, that is to say gases that do not comprise oxygen in gaseous form $O_2$; for this purpose, use is preferably made of a reducing boiler that consumes, at the inlet, gases that are depleted in gaseous oxygen $O_2$, and that delivers, at the outlet, gases which do not contain any thereof;

these first hot fuel gases G1 are mixed with second gases known as dilution gases G2, in order to form a mixture of non-oxidizing incoming gases G0 that do not comprise oxygen in gaseous form $O_2$;

this mixture of incoming gases G0 is sent upstream into the load 6 in order to generate therein a pyrolysis front 20;

an overpressure is created between the upstream end and the downstream end of the load 6 in order to force said pyrolysis front 20 to pass through it in a single direction from the upstream end to the downstream end;

downstream of the load 6, at a downstream chamber 19, third gases known as exiting gases G3 in a line 21, are recovered, at least a first portion of which gases G3 is transported in the form of a flow of said second dilution gases G2 by a transportation means 4, and a second portion constituted of gases known as service gases G4 of which complementary to the first portion constituted of said dilution gases G2, is discharged in the form of a flow of these fourth service gases G4 by a transportation means 8 to an outlet orifice or usage orifice, for example for filling cylinders with a view to reusing these service gases G4, or for supplying another installation, such as a dryer or the like.

In one preferential embodiment of the invention, the wood, or/and logging or saw mill products, or other plants, that will be referred to as "wood" in the remainder of the document, are arranged in order to form a load 6 in at least one basket 7 that allows the circulation of the gaseous or/and liquid fluids through the load 6. They will remain in this basket 7 throughout the duration of the carbonization operation and of the cooling operation after the actual carbonization. This basket 7, which contains a wood load 6, may be used as a perforation pallet and also as a storage pallet, both for the raw material and for the finished product. This basket 7 may be of very large size, for example having a length of a few meters. This basket may especially be filled directly in the forest. It makes it possible to treat loads that are heterogeneous in terms of species, moisture content and dimensions. This basket may be positioned in various orientations, and not necessarily vertical or horizontal, even though these are preferred embodiments of the invention.

The process according to the invention then comprises the following steps:
  the load 6 is placed in at least one basket 7 in a sealed device between a first upstream chamber 18 and a second downstream chamber 19;
  via at least one heating means external to the load 6, first hot fuel gases G1 are generated that are introduced into a mixing chamber 15;
  second dilution gases G2 are introduced into the mixing chamber 15;
  via circulation means 5, a mixture of incoming gases G0 made of said first fuel gases G1 and second dilution gases G2 is sent, in the first upstream chamber 18, to an overpressure with respect to the second downstream chamber 19, in order to generate in the load 6 a pyrolysis front 20 that is forced, under the action of said circulation means 5, to pass through the load in a single direction from the first upstream chamber 18 to the second downstream chamber 19;
  third exiting gases G3 are recovered in the second downstream chamber 19;
  at least one portion of the third exiting gases G3 is recovered in the form of a flow of the second dilution gases G2 that is transported by transportation means 4 to the mixing chamber 15.

Advantageously, the flow of second dilution gases G2 is transported by the transportation means 4 to the mixing chamber 15 separately from the first hot fuel gases G1.

In order to reduce the cooling time of the load after completing the carbonization cycle, the load 6 is advantageously cooled after complete pyrolysis by spraying water into the flow of the mixture of incoming gases G0.

In order to benefit from all the advantages of the control of the carbonization process within the load, the flow and temperature of the incoming gases G0 are regulated and a gas loop is managed by control of the flows of the fuel gases G1 and of the dilution gases G2, this control of the flows being designed to be capable of managing the temperature of the incoming gases G0, and the flow rate of the incoming gases G0 is also controlled by the circulation means 5.

From an economic viewpoint, the process according to the invention does not carry out any treatment on the exiting gases G3 other than a possible discharge of condensates, with the exclusion of any scrubbing, combustion, oxidation, reheating or cooling, compression or expansion treatment.

Preferably and advantageously, the pyrolysis front 20 is generated and advances in the opposite direction to natural convection which is established in the wood load 6, which amounts to saying that the inlet of the gases at the upstream end in the load 6 is preferably at an altitude greater than or equal to the outlet of the gases at the downstream end of this load.

In order to guarantee the introduction of incoming gases G0 that are free of oxygen, the first non-oxidizing hot fuel gases G1 are generated at a central reducing furnace in which an incomplete combustion is produced so that the first fuel gases G1 are free of oxygen gas $O_2$. This central furnace is preferably designed to be capable of supplying several carbonization chambers, each of which comprises a different load 6 which is subjected to a carbonization process independent of that of the other loads 6 fed by mixtures of incoming gases that use this same central furnace.

In one embodiment variant, as seen in the figures, in order to discharge the air introduced with the load 6 during the loading thereof, the portion of the exiting gases G3 which is not used to form the dilution gases G2 is conveyed to discharge and venting means 17 in particular in the form of a chimney, or/and to transportation means 16 where this portion constitutes service gases G4 capable of supplying combustion means such as a furnace, or a dryer, or of supplying any other use, either directly, or through a packaging of said service gases in cylinders or the like.

In one particularly advantageous method of implementing the process according to the invention, that makes it possible to obtain a better efficiency, the pyrolysis is carried out under pressure, and for this purpose a first upstream chamber 18 directly upstream of the load 6 and also a second downstream chamber 19 directly downstream of the load 6 are subjected to a pressure above atmospheric pressure. Although this pressure may be very slightly above atmospheric pressure, with an overpressure in the chambers of the order of a few thousand Pa, it is advantageously chosen to be a value between $10.10^5$ and $30.10^5$ Pa.

The invention is particularly well suited to the carbonization of eucalyptus, or coconut shells, or other similar tropical plants.

The invention also relates to a kiln module 100 designed to implementing the process.

This kiln module 100 may be mobile. The charcoal obtained in situ is around four times lighter than the wood. This mobility makes it possible to alleviate the cost of the transport.

This kiln module 100 designed for manufacturing charcoal or/and activated carbon, by implementing this process, is designed to be capable of receiving, at a carbonization chamber 25, a basket 7 designed to be capable of receiving a wood load 6. This carbonization chamber 25 is positioned between an upstream chamber 18 and a downstream chamber 19.

The kiln module 100 may comprise at least one heating means external to the load 6, designed to be capable of generating first non-oxidizing hot fuel gases G1. This heating means may also be external to the kiln module 100, to which it is connected.

According to the invention, the kiln module 100 comprises, upstream of the upstream chamber 18 and communicating with it, a mixing chamber 15 designed to be capable of receiving, on the one hand these first hot fuel gases G1, and on the other hand second dilution gases G2 originating from transportation means 4 that communicate with the downstream chamber 19, in order to form a mixture of incoming gases G0.

This basket 7, or else a housing 22, which comprises the kiln module 100 between the upstream chamber 18 and the downstream chamber 19 and which is designed to be capable of receiving the basket 7, is designed to be capable of prohibiting any passage of the incoming gases G0 external to the load 6 except in the upstream chamber 18. The kiln module 100 also comprises circulation means 5, designed to be capable of sending the mixture of incoming gases G0 to overpressure in the upstream chamber 18 with respect to the downstream chamber 19.

The kiln module 100 comprises means for managing and regulating the flow and temperature of the incoming gases G0, which means are designed to be capable of acting, on the one hand, for managing the temperature of the incoming gases G0. For this purpose, they act on flow distribution means 131, especially closure means, such as valves or dampers, situated in the path of the fuel gases G1, on flow distribution means 122 situated in the path of the dilution gases G2, on flow distribution means 134 on a line 16 situated in the path of a portion constituted of working gases G4 of the exiting gases G3 from the load 6, the other complementary portion of the exiting gases G3 constituting the dilution gases G2.

These means for managing and regulating the flow and temperature of the incoming gases G0 are also designed to be capable of acting, on the other hand, on circulation means 5 designed to be capable of generating a positive pressure differential between the upstream chamber 18 and the downstream chamber 19 in order to control the flow rate of the incoming gases G0. These managing and regulating means are also designed to be capable of controlling the operation of a furnace that generates the fuel gases G1.

Preferably, the kiln module 100 comprises a base 3 capable of receiving at least one such basket 7 and a cover 1 designed to be capable of being placed on top of each basket 7, in a sealed manner on the base 3.

This basket 7 is designed to be capable of receiving a wood load 6, and is positioned between an upstream chamber 18 and a downstream chamber 19.

Advantageously, the kiln module 100 comprises a trap 11, placed in a sealed manner on the cover 1, and which is capable of opening and closing in order to compensate for any explosions of gas possible during the carbonization, should an accidental intake of oxygen occur.

Preferably, the basket 7 is open or perforated at two of its ends, in order to allow the passages of gases or/and liquids. These ends communicate, one with the upstream chamber 18 and the other with the downstream chamber 19. The basket 7 is then sealed in a gastight manner on its other sides.

In one embodiment variant, when, preferably but not obligatorily, a relative sliding movement, in particular a vertical sliding movement, of the basket 7 in a housing 22 is provided. Even though this makes the implementation more difficult in terms of the seals to be provided, the basket 7 can then be completely perforated, on condition that its housing 22 is itself gastight.

Unlike the prior art of partial-combustion processes where a portion of the load 6 is burnt, which may then require a pre-drying operation, in order to facilitate the rise in temperature of the load of the kiln, before the oxygen is shut off, according to the invention it is ensured that incoming gases G0 at a regulated temperature circulate through the load 6 which is in the basket 7.

The non-oxidizing fuel gases G1 preferably result from the incomplete combustion of service gases G4. Advantageously, these service gases G4 are recovered downstream of the load 6, or of the load 6 that another neighboring kiln 100 comprises.

According to the invention, the mixing chamber 15, situated upstream of the upstream chamber 18 and in communication therewith, is capable of receiving, on the one hand the first hot fuel gases G1 resulting from the heating means and on the other hand second dilution gases G2, that result from transportation means 4 which communicate with a line 21 downstream of the downstream chamber 19. This chamber is designed to be capable of recovering exiting gases G3 resulting from the carbonization of the load 6. The transportation means 4 transports at least one portion of the exiting gases G3, known as dilution gases G2, toward the mixing chamber 15 separately from the fuel gases G1. The fuel gases G1 and dilution gases G2 are mixed in this fixing chamber 15, in order to form a mixture of incoming gases G0.

A portion of the exiting gases G3 is discharged in the form of a flow of service gases G4 via at least one line 16, especially under the effect of the pressure of the gases produced by pyrolysis. The complementary portion from the exiting gases G3, known as dilution gases G2, circulates in transportation means preferably constituted by a by-pass line 4. The dilution gases G2 arrive separately to the first hot fuel gases G1, at the mixing chamber 15.

The fourth service gases G4, discharged by the line 8, represent the excess of the exiting gases G3 in the gas loop produced by the implementation of the invention.

The kiln module 100 also comprises circulation means 5, designed to be capable of sending the mixture of incoming gases G0 to overpressure in the upstream chamber 18 with respect to the downstream chamber 19. These circulation means 5, which also carry out the mixing of the mixture of incoming gases G0, and are preferably constituted by at least one turbine or a fan, are sized so as to be capable of maintaining a sufficient pressure in order to push the pyrolysis front 20, in a single circulation direction through the load 6, from the upstream chamber 18 to the downstream chamber 19. Therefore, the energy of the mixing chamber 15 is extracted by circulation means 5, which set a circulation speed in the kiln, through the load 6. During the pyrolysis phase, as soon as vapor is extracted from the most upstream layer of the wood load 6, the heat released from the pyrolysis is directly consumed downstream of the load 6, namely in the bottom in the case of a vertical kiln as represented in the figures. The release of heat due to the pyrolysis is high enough to dry the rest of the wood of the load 6 and to initiate the reaction therein, which is self-sustaining.

Figures 1, 2, 3:
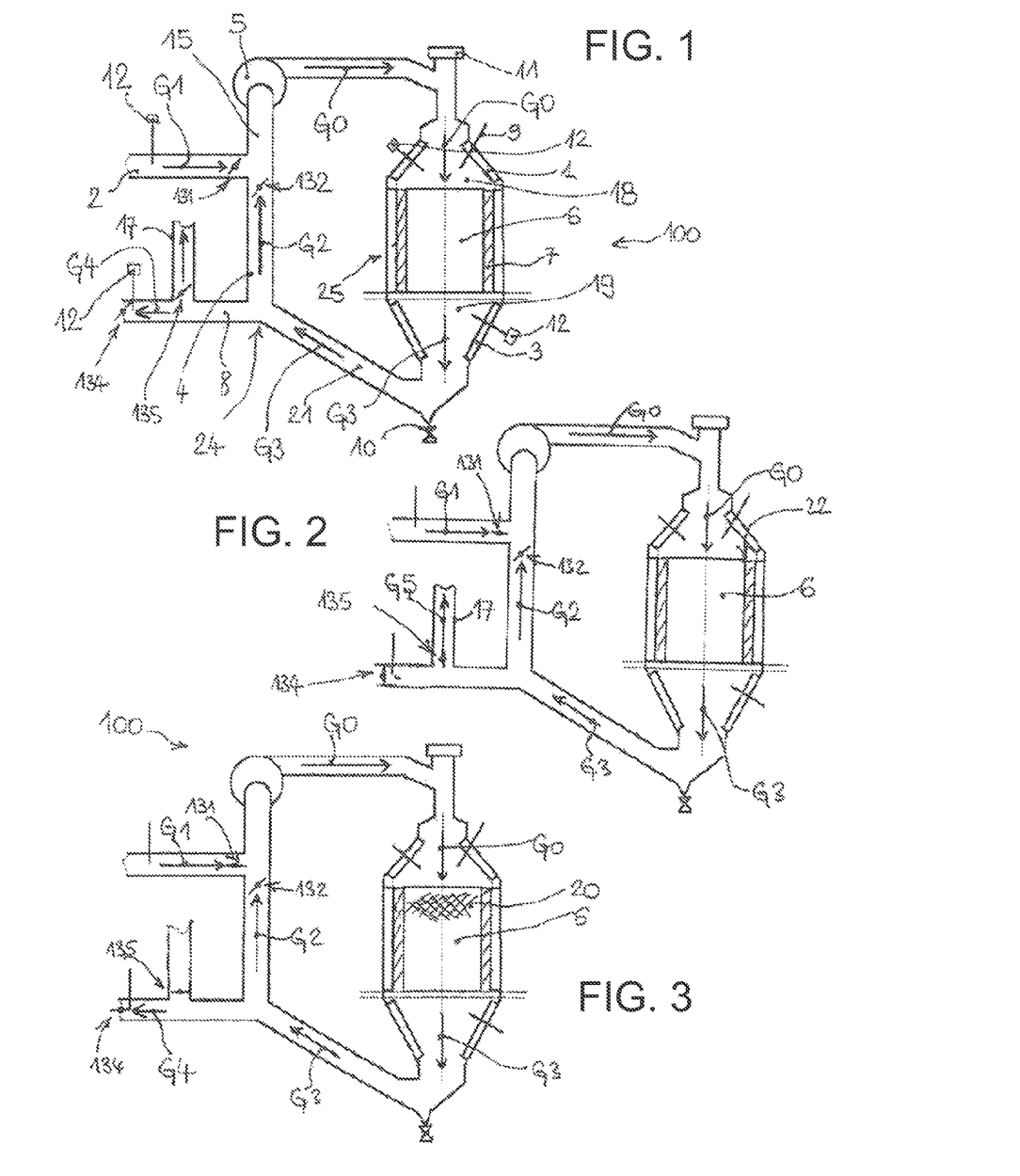
FIG. 1 represents, schematically, partially and in cross section, a device for implementing the invention.
FIG. 2 represents, in a similar manner, the device from FIG. 1 during the beginning of a first start-up phase of the process according to the invention.
FIG. 3 represents, similarly, the device from FIG. 1 during the remainder of this first start-up phase of the process according to the invention.

FIG. 3 shows the initiation of the pyrolysis front 20 in the upstream portion of the load 6, the fuel gases G1 alone provide the supply of energy, the dilution gases G2 are only constituted by gases that are still cold at the downstream chamber 19. The circulation of the gases is at minimum regime, in order to allow the discharge of the excess gas in the kiln module 100 as service gases G4.

A bifurcation 24 separates the dilution gases G2 into a transportation means or a by-pass line 4 equipped with closure means or a butterfly valve 132 on the one hand, and service gases G4 in a transportation means or at least one line 16 equipped with closure means or a butterfly valve 134 on the other hand.

In one alternative embodiment, the device comprises, preferably downstream of this bifurcation 24, after a line 8, a T-fitting for connection to an extraction line, especially a chimney 17, designed in order to evaporate the gaseous oxygen which is present in the kiln, especially which has been introduced therein in the form of air with the wood load 6 itself. During the start-up of the installation, after the loading of a new wood load 6, the closure means 134 of the line 16 are closed, thus prohibiting any flow of service gases G4, and the extraction line or chimney 17 discharges the exiting gases G3 which are cold and which contain gaseous oxygen. On appearance of the first vapors exiting the chimney 17, it is sufficient to seal the closure means 135 with which it is equipped and to reopen the closure means 134 of the line 16, so as to free the passage of the service gases G4 to the downstream end.

Figures 4, 5:
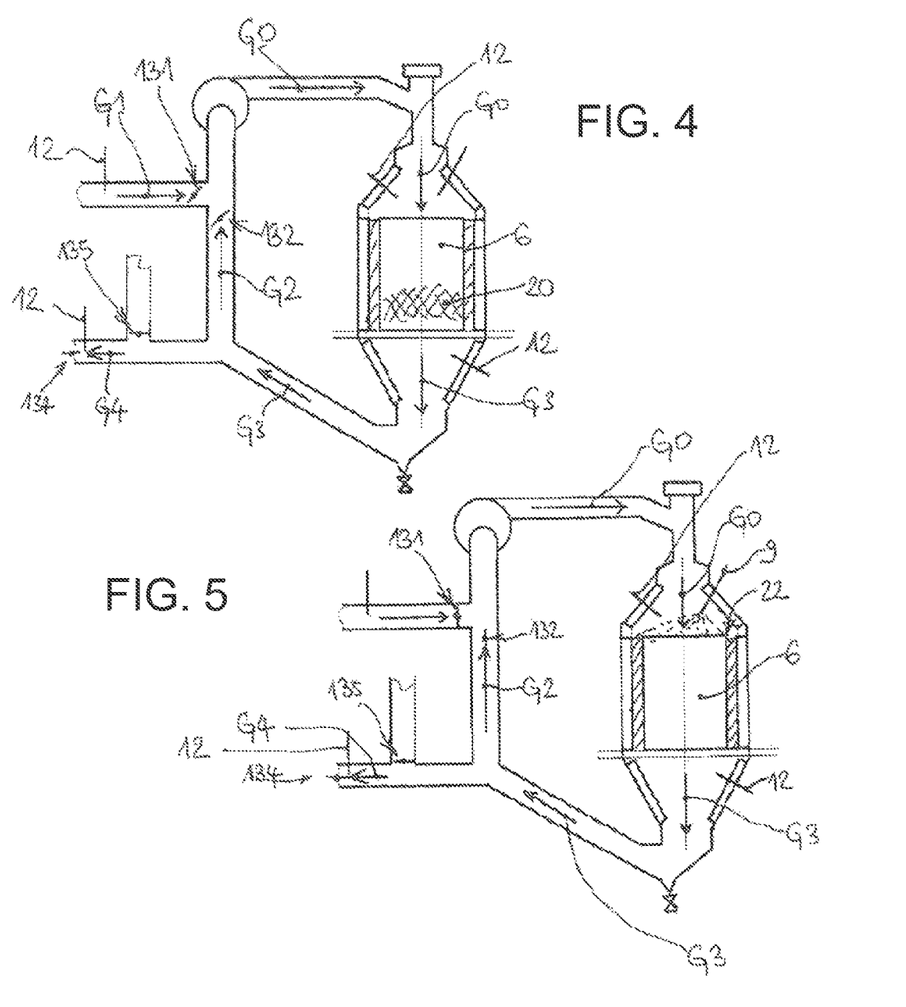
FIG. 4 represents, similarly, the device from FIG. 1 during a second carbonization phase of the process according to the invention.
FIG. 5 represents, similarly, the device from FIG. 1 during a third cooling phase of the process according to the invention.

FIG. 4 shows the system in sustained operation, the pyrolysis front 20 advances to the downstream end of the load 6, the pyrolysis provides the necessary energy, the provision of energy by the fuel gases G1 is minimal for the sole maintaining of the temperature, the gases circulate through the by-pass.

The circulation means 5 are preferably installed in the upper part of the kiln module 100, in order to force these incoming gases G0 to circulate from top to bottom, through the load 6, in opposition to natural convection.

In the invention, at least one heating means, advantageously external to the kiln module 100, is used to produce the fuel gases G1, which are used to provide the energy necessary for the initiation of the pyrolysis of the most upstream part of the wood load 6. It comprises a reducing furnace, so as not to generate gaseous oxygen $O_2$. This heating means may especially use the fourth service gases G4. In the absence of installations that make it possible to use the latter service gases, the installation 100 comprises, or is connected to, an oxidizing open furnace, for the combustion thereof and the release into the atmosphere of gases that are harmless to human health.

In one preferred embodiment, the base 3 communicates with the downstream chamber 19 or incorporates the latter, and comprises the outlet line 8, and also the by-pass line 4. This base 3 may be buried or positioned on a floor. It advantageously comprises an outlet valve 10 for condensates, accumulated at its lowest point.

This base 3 may also constitute the downstream chamber 19, or lower chamber in the case of a basket 7 mounted vertically, from which dilution gases G2 are transported toward the mixing chamber 15, the remainder of the exiting gases G3, constituted by the service gases G4, being discharged by another transportation means to a usage or treatment device, preferably by combustion as explained above. The system thus comprises a gas circulation loop that allows precise management of the temperature in the wood load 6.

One important advantage of the invention is to overcome the problem of the prior art, linked to the need, before treating a new load, to stop the kiln and to wait for the load to cool down, over a long period.

In one preferred embodiment, the basket 7 is incorporated, at the carbonization chamber 25, in a housing 22 equipped with at least one loading door. This housing 22 comprises, at least at its periphery around the basket 7, at least one heat exchanger 23, the latter being designed in a sealed manner in order to prohibit any passage of said incoming gases G0 from the upstream chamber 18 to the downstream chamber 19 other than through the load 6.

According to the invention, after the pyrolysis and the complete carbonization, at the desired stage, water is sprayed over the load 6, via the upstream end and preferably via the top. The temperature in this zone is controlled in order to ensure the vaporization of this water in contact with the load 6, but not the wetting of the latter. It is thus possible to rapidly lower the temperature of the chamber of the kiln that contains the load 6, and reduce the amount of energy in this chamber.

An effective and rapid cooling of the load 6 is thus obtained by spraying water into the flow of the mixture of gases G0. For this purpose, the kiln module 100 comprises cooling means that comprise injections means 9, in particular an injection nozzle or/and spray nozzle or/and atomizing nozzle, located in the mixing chamber 15, or in the upstream chamber 18, or in both. Direct spraying into the chamber 18 makes it possible to blow the water on top of the basket or basket 7 without creating thermal shock in the circulation means 5, when the latter are constituted by a fan.

FIG. 5 shows the water spray, the circulation of the gases is maintained at its maximum. The inlet for the gases G1 is closed and no longer provides energy, the latter gases are discharged at G4, and then the condensates and runoff water are discharged at 10, especially at least one valve.

The vaporization temperature of the water is rapidly attained in the upper portion of the load 6, the cooling is considered to be finished when the temperature at the base of this load is low enough, i.e. usually slightly above the vaporization temperature of the water, in order to unload the basket 7 from the kiln. On opening the kiln 100, the load may ignite in contact with oxygen from the ambient air. The basket 7 is then placed under a fire-smothering bell jar, for one or two days, in order to finalize the cooling of the charcoal, preferably at a transit zone before packaging.

Preferably, top and bottom temperature or/and pressure sensors 12 of the load, and flow rate or/and pressure or/and temperature sensors 12 of the gases passed through a turbine, constitute the inputs of an automated control system for carrying out the process in the installation, without an operator, for example in the form of a programmable controller, computer or similar, designed to be capable of controlling the circulation means 5 or/and the injection means 9 and valves 10. Such a control system may also control one or more control dampers 13, in particular 131 of the first fuel gases G1 or/and 132 of the second dilution gases G2, in terms of pressure or/and flow rate, or/and also the control means 134 of the line 16, and 135 of the chimney 17.

Measurement of the temperature difference between the upstream end and the downstream end of the load 6 allows simple and precise control of the type of carbonization, and therefore allows homogeneous charcoal to be obtained, which, depending on its degree of burning, is of "not very burnt" quality to "very burnt" quality depending on requirements. This was impossible for traditional kilns and very difficult in most of the industrial systems of the prior art.

The energy provided to the heating means, especially boiler or furnace, in order to produce the fuel gases G1, results from any fuel: wood, gas, pyrolysis gas or other gas, or a mix.

The weighing of the load before it is loaded into the kiln and after cooling enables the efficiency of the kiln module to be controlled.

The cycle time is dependent on the thickness of the load 6 to be passed through by the gases, and is in general shorter than the processes of the prior art where, in particular in a tropical forest, it is known to carry out only two cycles of 12 days per month in one and the same kiln according to the prior art.

With the invention, it is possible to move on very quickly to the treatment of the next load, with well stabilized parameters at a boiler constituting the heating means.

Preferably, the kiln module 100 is thermally insulated.

It should be noted that out of all the energy used for the carbonization, the heating means provide only a small portion thereof, especially at start-up when it is a question of initiating the pyrolysis front 20 while drying wet or sap-filled wood. The heating means must be sized in order to allow the initiation of the pyrolysis front 20 and for temperature maintenance, especially for the end of the carbonization which is more endothermic. The heating means therefore behave as a priming starter. And it is thus understood that one and the same heating means can be allocated, at the same time, to several loads for which the degree of progress of the carbonization is different. In one particular embodiment, one and the same heating means can therefore supply several carbonization zones, arranged as a star, in a line or otherwise, in the vicinity of the heating means. This organization is very advantageous in the case where this heating means may be fed by the service gases G4 resulting from several carbonization zones. Moreover, it is possible to run several loads 6 which are at different stages of carbonization, and to stagger their carbonization cycles so as to be able to sequence the loading and unloading operations.

The design of production installations constituted of kiln modules 100 that each contain a load 6, distributed around heating means, also makes the installation easier to transport, in particular in a tropical forest where access is often difficult.

The invention also relates to one such carbonization installation, in particular for the manufacture of charcoal or/and activated carbon, according to the process described above, that comprises several devices 100 each as described above. This installation comprises at least one central furnace that generates fuel gases G1 for at least two devices 100 which are connected thereto.

The net efficiency, once the energy provided by the heating means, if the latter operates using wood, has been deducted, between the mass of charcoal and the mass of wood load treated, is particularly advantageous with the invention, since it exceeds 25%, with a carbon content close to 82%, versus an efficiency that is usually less than 20% in the prior art.

In short, the fuel gases G1 are those which provide energy to the load 6 within a kiln module, in order to ensure the temperature and the maintenance thereof. They may result from a heating means external to the load 6 but integrated into the kiln module 100, or else from a heating means external to this kiln module 100 itself.

The dilution gases G2 are those which make it possible to form the gas loop, and arrive as a mixture with the fuel gases G1 in the mixing chamber 15.

The incoming gases G0 resulting from this mixing and that are brought to a suitable pressure by the circulation device 5 are truly the gases for controlling the carbonization.

The invention provides novel advantages:
limitation of points of overheating;
homogenization of the temperature of the load provided by the flows of hot gases;
demarcation of the values of the physical quantities for carrying out the process, and also of the characteristics of the product obtained.

In short, according to the invention, instead of directly burning the gases, only a portion thereof is circulated as a loop in order to obtain a flow of gases that is controlled in terms of temperature and flow rate in the load, the excellent efficiency of the device makes it possible to keep most of the gases resulting from the reaction available for another use.

The atomization of the process may be complete, as regards the control of temperature, of throughput, of pressure, of flow rate.

The presence of the circulation means 5 makes it possible to slow down the carbonization, so as to control the parameters thereof. Any runaway characteristic of the kilns of the prior art, particularly in continuous mode, is thus sure to be avoided.

The complete device is mobile and easily transportable.

The invention can be used for manufacturing activated carbon, owing to the possibility of high-temperature carbonization, and also to the possibility of steam injection.

The spraying has, finally, another advantage, which results from the generation of steam which acts as a solvent and cleaning agent for the charcoal produced, which makes it possible to deliver a product that is clean and capable of better lighting, required by certain industries.

The qualitative advantages of the invention are significant, since the amount of product not carbonized is very low, or even zero, since the passing through of the flow of gas homogenizes the temperatures within a given stratum of the load, unlike the usual case of a static treatment where the temperatures are very different and are not very reproducible.

The invention also makes it possible to retain large pieces, and generates very few fines, unlike the usual vertical kilns where the load drops and breaks. The reduction in the load handling operations is also a favorable factor for retaining pieces of large size.

The invention claimed is:

1. A process for manufacturing charcoal or/and activated carbon from a wood load, comprising the steps of:
    placing said wood load in at least one basket in a sealed device between a first upstream chamber and a second downstream chamber;
    generating first non-oxidizing hot fuel gases that do not comprise oxygen in gaseous form $O_2$;
    introducing said first non-oxidizing hot fuel gases into a mixing chamber;
    mixing in said mixing chamber said first non-oxidizing hot fuel gases with second dilution gases, to form a mixture of non-oxidizing incoming gases that do not comprise oxygen in gaseous form $O_2$;
    sending upstream into said wood load said mixture of non-oxidizing incoming gases to generate therein a pyrolysis front;
    creating an overpressure between the upstream end and the downstream end of said wood load to force said pyrolysis front to pass through in a single direction from the upstream end to the downstream end;
    recovering downstream of said load third exiting gases, at least a first portion of which being transported, directly into the mixing chamber and by transportation means, in the form of a flow of said second dilution gases to be mixed with said first hot fuel gases, and a second portion of which complementary to the first portion being discharged in the form of a flow of fourth service gases by a transportation means to an outlet orifice;
    said overpressure being a pressure above atmospheric pressure having a value between $10.10^5$ and $30.10^5$ Pa, said pyrolysis front advancing in said wood load against a natural convection in said wood load.

2. The process for manufacturing charcoal or/and activated carbon, as claimed in claim 1, further comprising the steps of:
    sending via circulation means, the mixture of non-oxidizing incoming gases, in said first upstream chamber, to create the overpressure with respect to said second downstream chamber downstream of said load to generate in the latter the pyrolysis front that is forced, under the action of said circulation means, to pass through said load in the single direction from said first upstream chamber to said second downstream chamber.

3. The process as claimed in claim 1, further comprising the step of cooling said load after complete pyrolysis by spraying water into the flow of said mixture of incoming gases.

4. The process as claimed in claim 1, further comprising the steps of:
    regulating the flow and temperature of said incoming gases;
    managing a gas loop by controlling the flows of said fuel gases and the flows of said dilution gases, said controlling of the flows managing the temperature of said incoming gases; and
    controlling the flow rate of said incoming gases by circulation means.

5. The process as claimed in claim 1, further comprising the step of:
 conveying a portion of said exiting gases not being used to form said dilution gases to venting means being a chimney, or/and to transportation means, said exiting gases portion being service gases and supplying combustion means directly or through a packaging of said service gases into cylinders.

* * * * *